United States Patent
Mashimo

(10) Patent No.: US 7,209,421 B2
(45) Date of Patent: Apr. 24, 2007

(54) OPTICAL DISK APPARATUS FOR DETECTING WOBBLE SIGNAL

(75) Inventor: Akira Mashimo, Tokorozawa (JP)

(73) Assignee: TEAC Corporation, Musashino-shi (JP)

( * ) Notice: Subject to any disclaimer, the term of this patent is extended or adjusted under 35 U.S.C. 154(b) by 638 days.

(21) Appl. No.: 10/759,653

(22) Filed: Jan. 16, 2004

(65) Prior Publication Data

US 2004/0145981 A1    Jul. 29, 2004

(30) Foreign Application Priority Data

Jan. 20, 2003    (JP)    ............... 2003-11320

(51) Int. Cl.
*G11B 7/00*    (2006.01)

(52) U.S. Cl. ............... 369/53.34; 369/47.34; 369/59.17

(58) Field of Classification Search ............. 369/53.34, 369/47.35, 59.17
See application file for complete search history.

(56) References Cited

U.S. PATENT DOCUMENTS

| 6,351,441 B1 * | 2/2002 | Andoh | ............... 369/53.3 |
| 6,670,831 B2 * | 12/2003 | Mashimo | ............... 327/34 |
| 6,680,892 B2 * | 1/2004 | Mashimo | ............... 369/59.17 |
| 2002/0067676 A1 * | 6/2002 | Inokuchi et al. | ......... 369/59.15 |
| 2003/0185122 A1 * | 10/2003 | Akiyama et al. | ........ 369/47.53 |

FOREIGN PATENT DOCUMENTS

JP    2002-324360 A    8/2002

* cited by examiner

*Primary Examiner*—Wayne Young
*Assistant Examiner*—Linh T. Nguyen
(74) *Attorney, Agent, or Firm*—Christensen O'Connor Johnson Kindness PLLC

(57) ABSTRACT

An optical disk apparatus for driving an optical disk having formed therein sawtooth wobbles of +STW and −STW. A pickup receives a laser beam reflected from the optical disk and supplies a reproduced signal to a wobble signal processing section. The wobble signal processing section differentiates the reproduced signal and binarizes the differential signal with reference to a zero level. A pulse length of the binary signal achieved during a positive period is compared with that of the binary signal achieved during a negative period. When the pulse length achieved during the positive period is longer than that achieved during the negative period, the binary signal is determined to be a +STW. In contrast, when the pulse length achieved during the negative period is longer than that achieved during the positive period, the binary signal is determined to be a −STW, whereby a wobble signal is demodulated.

10 Claims, 8 Drawing Sheets

OPTICAL DISK APPARATUS FOR DETECTING WOBBLE SIGNAL

BACKGROUND OF THE INVENTION

1. Field of the Invention

The present invention relates to an optical disk apparatus, and more particularly, to an optical disk apparatus which records/reproduces data on and from an optical disk having sawtooth wobbles (STW) formed thereon.

2. Related Art

In an optical disk apparatus, wobbles of a track of an optical disk are detected, and the thus-detected wobbles are used for detecting an address position and controlling a rotation speed. In connection with those wobbles, there have already been proposed a technique for wobbling a track through use of a cosine wave having a fundamental frequency $f_{wob}$ (22 kHz) and a technique for forming a sawtooth wobble SWT by means of adding or subtracting a sine wave whose frequency is double that of the cosine wave.

FIG. 10 shows a modulation scheme using a sawtooth wobble STW. Portions of a fundamental cosine wave; i.e., $\cos(2\pi \cdot f_{wob} \cdot t)$, are replaced with a STW that is obtained by means of adding or subtracting a sine wave; i.e., $a \cdot \sin\{2\pi \cdot (2 \cdot f_{wob}) \cdot t\}$, to or from the cosine wave. Here, a=0.25. $+\cos(2\pi \cdot f_{wob} \cdot t)+a \cdot \sin\{2 \cdot (2 \cdot f_{wob}) \cdot t\}$, which is obtained by adding the sine wave to the cosine wave, represents a digital value of "1." Further, $\cos(2\pi \cdot f_{wob} \cdot t)-a \cdot \sin\{2\pi \cdot (2 \cdot f_{wob}) \cdot t\}$, which is obtained by subtracting the sinewave from the cosine wave, represents a digital value of "0." The STW obtained by adding a sine wave to a cosine wave can be represented as "+STW," "right slope STW," "mild up slope right STW," or the like. A signal obtained by subtracting a sine wave from a cosine wave can be represented as a "−STW," "left slope STW," "mild down slope left STW," or the like. In the present patent application, an STW obtained as a result of addition of a sine wave is denoted as "+STW," and an STW obtained as a result of subtraction of a sine wave is denoted as "−STW." Information about an optical disk, such as a disk size, a disk structure (a single layer or a multilayer), and optimum laser power, can be recorded on an optical disk by means of inserting a +STW or a −STW.

As mentioned above, use of a +STW and a −STW enables embedding of various information items into a wobble signal. Extraction of a wobble signal from a signal reflected from an optical disk and reliable identification of a +STW from a −STW are required.

SUMMARY OF THE INVENTION

The present invention provides an optical disk apparatus capable of readily and reliably reproducing a wobble signal when data are recorded/reproduced on or from an optical disk having sawtooth wobbles formed therein.

An optical disk apparatus of the invention is an optical disk apparatus for recording or reproducing data on and from an optical disk, the apparatus comprising: a wobble of the optical disk being a sawtooth wobble obtained as a result of a sine wave being added to or subtracted from a cosine wave of predetermined frequency; light-receiving means for receiving a laser beam reflected from the optical disk; and wobble processing means for acquiring a wobble signal from a signal output from the light-receiving means, wherein the wobble processing means comprises differentiating means for differentiating a signal output from the light-receiving means; binarizing means for binarizing a differential signal from the differentiating means through use of a threshold value; and demodulation means for demodulating the binary signal in accordance with the pulse lengths of the respective two values of the binary signal from the binarizing means. In a +STW (or a right slope STW) obtained as a result of addition of a sine wave to a cosine wave, a right slope period or rise period is longer than a left slope period or fall period. In contrast to the +STW, in a −STW (or a left slope STW) obtained as a result of subtraction of the sine wave from the cosine wave, the left slope period or fall period is longer than the right slope period or rise period. Therefore, in relation to a signal obtained as a result of differentiation (or time differentiation) of the signal, in the +STW a positive level period corresponding to the rise period is longer than a negative level period corresponding to the fall period. In the case of the −STW, the positive level period becomes shorter than the negative level period. For this reason, a differential signal is binarized through use of a threshold value, and a pulse length to be achieved during the positive level period and that to be achieved during the negative level period are compared with each other, whereby the +STW and the −STW are extracted in a distinguished manner.

For instance, a zero level of the differential signal can be used for the threshold value to be used for binarizing the differential signal.

The present invention can be applied to an optical disk apparatus which records/reproduces data on an arbitrary optical disk which partially adopts at least a method for modulating data through use of a +STW and a −STW.

The invention will be more clearly comprehended by reference to the embodiments provided below. However, the scope of the invention is not limited to the embodiments.

DESCRIPTION OF THE PREFERRED EMBODIMENTS

Embodiments of the invention will be described hereinbelow by reference to the drawings.

Figure 1:
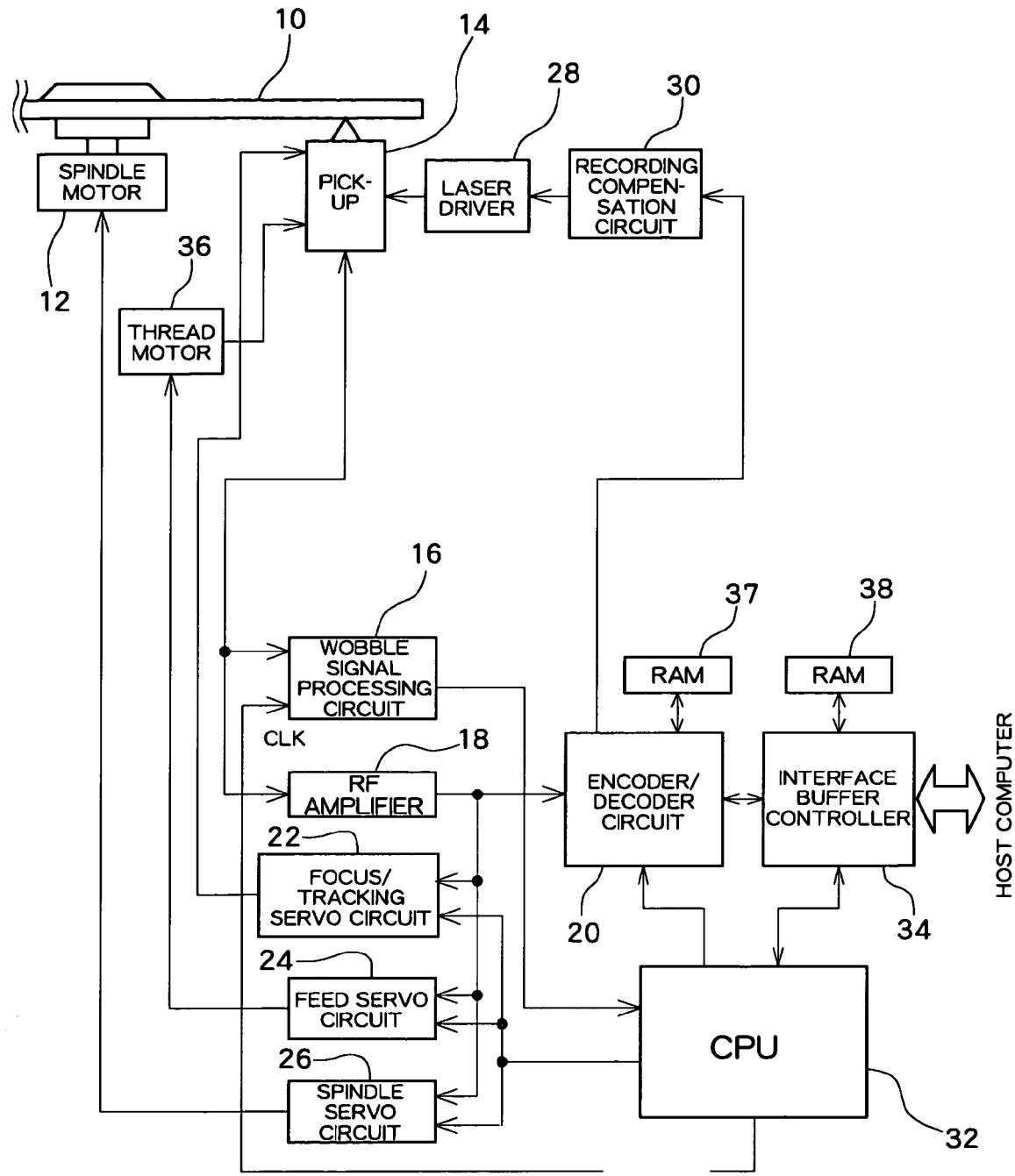
FIG. 1 is a configuration block diagram of an optical disk apparatus.

FIG. 1 is a configuration block diagram of an optical disk apparatus according to an embodiment of the invention. A sawtooth wobble STW is inserted into an optical disk 10, and the optical disk 10 is rotationally driven by means of a spindle motor 12. The STW is defined as follows:

+STW=$\cos(2\pi \cdot f_{wob} \cdot t)+a \cdot \sin\{2\pi \cdot (2 \cdot f_{wob}) \cdot t\}$ $-STW = \cos(2\pi \cdot f_{wob} \cdot t) - a \cdot \sin\{2\pi \cdot (2 \cdot f_{wob}) \cdot t\}.$ The +STW represents a digital value of 1, and the −STW represents a digital value of 0.

The spindle motor 12 rotationally drives the optical disk 10 such that the optical disk 10 rotates at a predetermined rotational speed. The spindle motor 12 is subjected to servo control performed by a spindle servo circuit 26.

A pickup 14 has a laser diode or a photo detector and is disposed opposite the optical disk 10. The pickup 14 radiates a laser beam onto the optical disk 10, thereby recording data, and converts the light reflected from the optical disk 10 into an electric signal, thereby outputting a reproduced signal. The position of the laser beam radiated from the pickup 14 onto the optical disk 10 is controlled by mean of a thread motor (feed motor) 36 and a focus/tracking servo circuit 22. Specifically, the thread motor 36 actuates a carriage constituting the pickup 14 in a radial direction of the optical disk 10 under the control of a feed servo circuit 24. The focus/tracking servo circuit 22 performs a focus/tracking control operation by means of driving focus and tracking actuators of the pickup 14. A signal reproduced by the pickup 14 is supplied to a wobble signal processing section 16 and an RF amplifier 18.

The wobble signal processing section 16 extracts a wobble signal from the reproduced signal and supplies the thus-extracted wobble signal to a CPU 32. Specifically, only a component having a predetermined wobble frequency is extracted from the reproduced signal, and a +STW component and a −STW component are decoded while being distinguished from each other. A result of decoding is supplied to the CPU 32. Even in the embodiment, the wobble signal is considered to include various information items, such as a disk size, a disk structure, and optimum laser power.

The RF amplifier 18 amplifies the reproduced signal and supplies the thus-amplified reproduced signal to various servo circuits, such as an encoding/decoding circuit 20, the focus/tracking servo circuit 22, the feed servo circuit 24, and the spindle servo circuit 26.

The encoding/decoding circuit 20 has an equalizer, a PLL circuit for generating a reference clock signal, and a binarizer; decodes the reproduced signal; and then supplies the thus-decoded signal to an interface buffer controller 34. RAM 37 is used as a workspace of the encoding/decoding circuit 20. At the time of recording of data, the encoding/decoding circuit 20 encodes data to be recorded and supplies the thus-encoded data to a recording compensation circuit 30. On the basis of the encoded data, the recording compensation circuit 30 drives a laser driver 28 by means of a predetermined recording strategy. The laser driver 28 supplies a drive current to a laser diode provided in the pickup 14, thereby causing the pickup 14 to emit a laser beam of recording power.

The interface buffer controller 34 exchanges data with a host computer and controls a data buffer. RAM 38 is used as a workspace of the interface buffer controller 34.

The CPU 32 controls the entire system in accordance with a command output from the host computer. The wobble signal extracted and decoded by the wobble signal processing section 16 is supplied to the CPU 32 in the manner described above. The CPU 32 sets the size, optimum recording power, optimum reproduction power, or the like, of the optical disk, on the basis of the wobble signal and controls individual sections. Since the fundamental frequency $f_{wob}$ of the wobble signal is known, the frequency can also be used for controlling the rotational speed. Specifically, the wobble signal processing section 16 may detect the frequency of the wobble signal, and the spindle servo circuit 26 may control the spindle motor 12 in accordance with the frequency.

Figure 2:
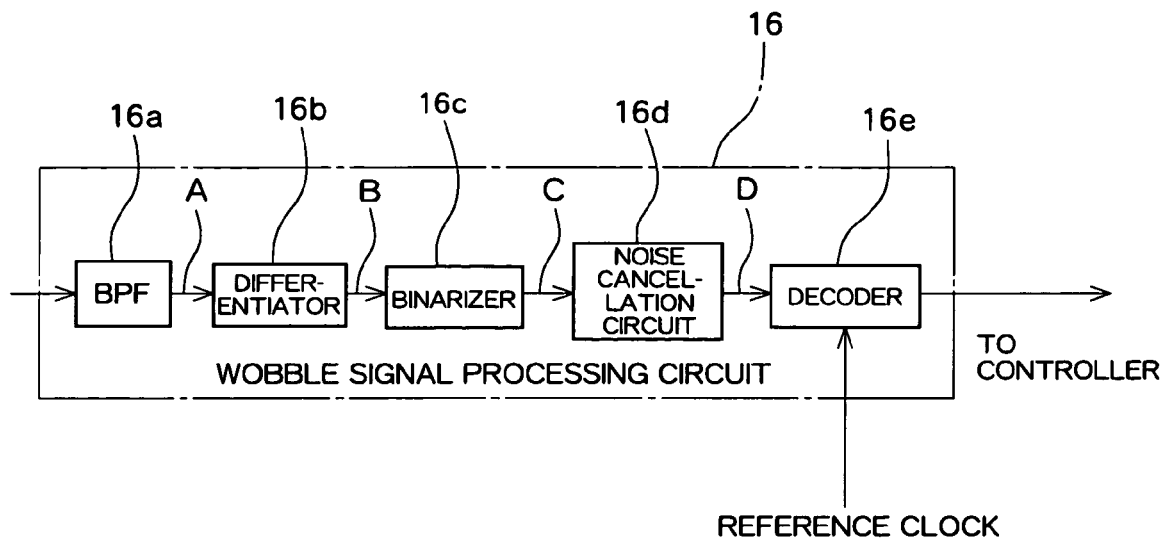
FIG. 2 is a configuration block diagram of a wobble signal processing section shown in FIG. 1.

FIG. 2 is a configuration block diagram of the wobble signal processing section 16. The wobble signal processing section 16 is constituted of a bandpass filter BPF 16a, a differentiator 16b, a binarizer 16c, a noise cancellation circuit 16d, and a decoder 16e. The reproduced signal output from the pickup 14 is supplied to the bandpass filter BPF 16a, and components, such as predetermined frequencies $f_{wob}$ and $2 \times f_{wob}$, are extracted and supplied to the differentiator 16b.

The differentiator 16b subjects the signal output from the bandpass filter BPF 16a to time differentiation and outputs a differential signal to the binarizer 16c.

The binarizer 16c binarizes the differential signal output from the differentiator 16b with reference to the zero level and supplies the thus-binarized signal to the noise cancellation circuit 16d.

The noise cancellation circuit 16d removes noise (e.g., chattering) contained in the binary signal output from the binarizer 16c and delivers the thus-removed binary signal to the decoder 16e.

The decoder 16e measures the pulse lengths of respective values of a noise-removed binary signal output from the noise cancellation circuit 16d. On the basis of the thus-measured pulse lengths, the decoder 16e determines whether each of the binary signals is a +STW or a −STW and then demodulates the signals. The pulse length is measured by means of counting the number of reference clock pulses. The wobble signal demodulated by the decoder 16e is supplied to the CPU 32.

Figure 3:
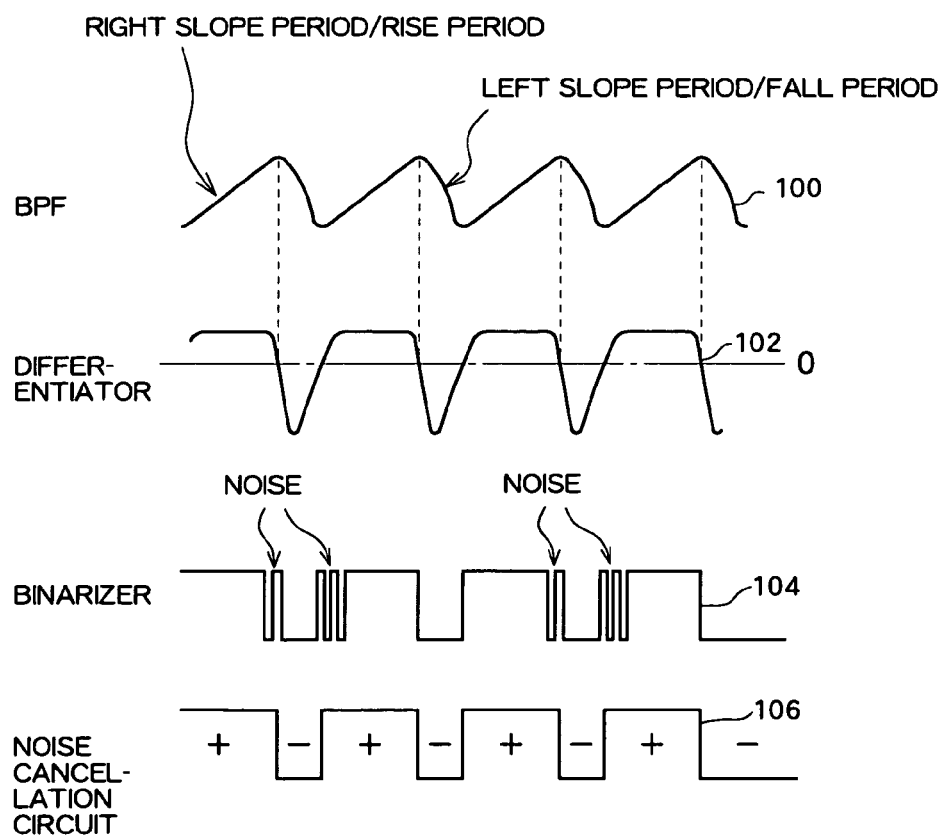
FIG. 3 is a timing chart showing waveforms of signals output from individual sections shown in FIG. 2.

FIG. 3 shows signal waveforms of individual sections provided within the wobble signal processing section 16 shown in FIG. 2. "BPF" denotes a waveform output from the bandpass filter BPF 16a. A +STW formed by addition of a sinewave to a cosine wave is illustrated by way of an example. In FIG. 3, for convenience of explanation, the +STW is highlighted. "DIFFERENTIATOR" denotes a wave form output from the differentiator 16b; that is, a differential signal waveform of the signal output from the BPF 16a. There is obtained a differential waveform, wherein a right up slope portion of the signal output from the BPF 16a becomes a positive level; a peak of the output signal assumes a value of 0; and a right down slope portion becomes a negative level. For reference, a zero (0) level is also illustrated by a dashed line. "BINARIZER" shows a waveform of a signal output from the binarizer 16c; namely, a binary signal which has been binarized while the zero level of the differential signal is taken as a reference. There is obtained a binary signal which becomes positive during a period in which the signal exceeds the 0 level and becomes negative during a period in which the signal becomes lower than or equal to the 0 level.

However, the differential signal includes noise, and hence the binary signal comes to include noise components (chattering) such as those shown in the drawing, as a result of having crossed the zero level a plurality of times during the rise and fall periods. "NOISE CANCELLATION CIRCUIT" denotes a signal output from the noise cancellation circuit 16d; that is, a binary signal from which noise components have been eliminated. Such a binary signal is supplied to the decoder 16e.

As can be seen from the drawing, the +STW is formed by adding to a cosine wave a sine wave whose frequency is double that of the cosine wave. Hence, a right up slope period is longer than a right down slope period. Hence, in the binary signal that is obtained by means of binarizing a differential signal with reference to a zero level, a positive period becomes longer than a negative period. By utilization of this fact, the decoder 16e determines whether the binary signal is a +STW or a −STW and demodulates the signal. In the case of the illustrated binary signal, (the pulse length of the positive period)>(the pulse length of the negative period), and hence the decoder 16e demodulates the signal as a +STW; i.e., a digital value of "1," and supplies the thus-demodulated data to the CPU 32.

In the meantime, in contrast to the case of the +STW, when the wobble signal is a −STW, the right up slope period becomes shorter than the right down slope period. Accordingly, the positive period of the binary signal that is obtained by binarizing the differential signal with reference to the zero level becomes shorter than the negative period thereof. When having determined (the pulse length of the positive period)<(the pulse length of the negative period) by means of measuring the pulse length of the positive period and that of the negative period, the decoder 16e determines the binary signal as a −STW, demodulates the signal as a digital value of "0," and then supplies the thus-demodulated data to the CPU 32.

In summary, procedures for identifying a binary signal as a +STW or a −STW are as follows:

(1) Subject a wobble signal to differential processing.

(2) Binarize the thus-differentiated wobble signal with a zero level thereof being taken as a threshold value.

(3) Detect the length of a positive period of the binarized signal and that of a negative period of the same.

(4) If the length of the positive period is longer than that of the negative period, the wobble signal is determined as a +STW or "1." If the length of the positive period is shorter than that of the negative period, the wobble signal is determined as a −STW or "0."

As mentioned above, in the embodiment, the wobble signal can be detected without fail by means of utilizing the fact that the right up slope period of the wobble signal becomes longer than that of the right down slope period in the +STW and that the right up slope period of the wobble signal becomes shorter than that of the right down slope period in the −STW. The wobble signal detection section 16 of the embodiment is required to solely implement a differentiating function and a binarizing function and to compare resultant binary signals with each other in terms of a pulse length. Hence, the wobble signal detection section 16 can be realized in a simple configuration.

Figure 4:
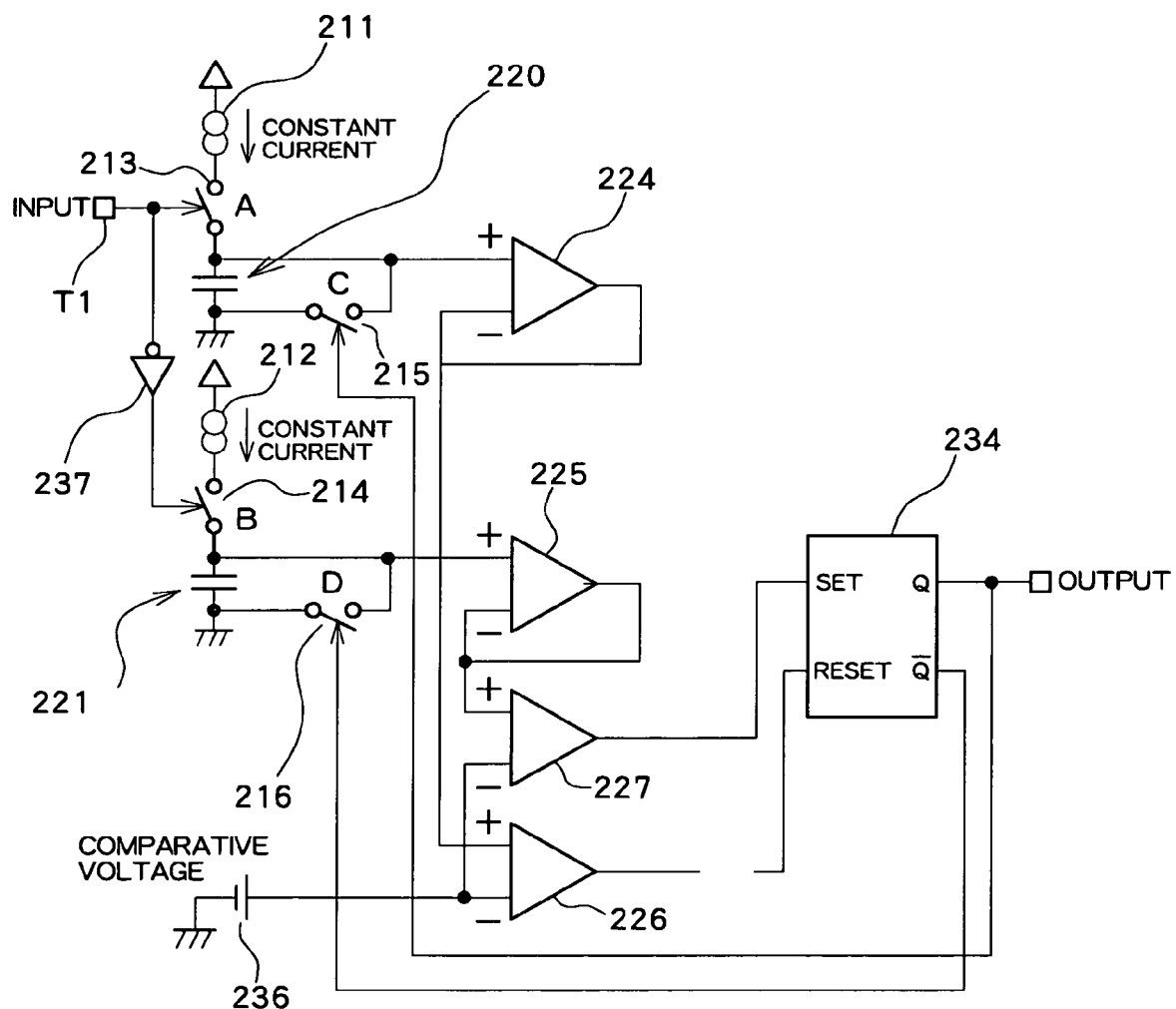
FIG. 4 is a circuit block diagram of a noise cancellation circuit shown in FIG. 2.
Figure 5:
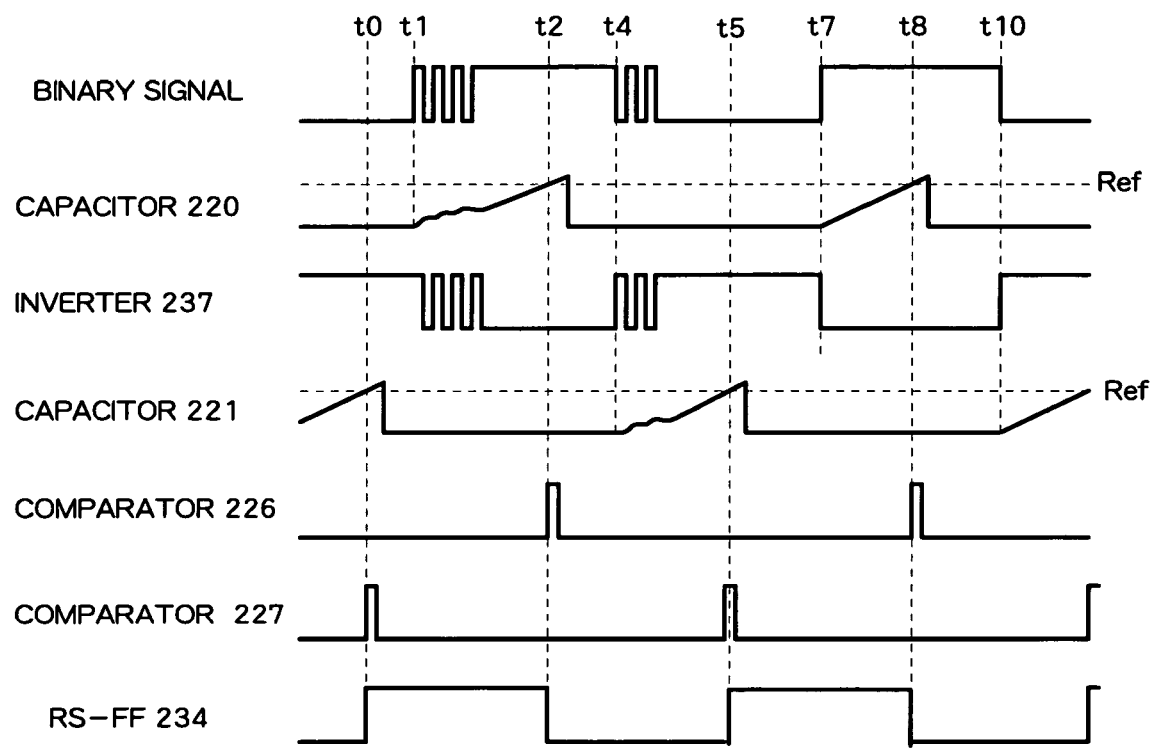
FIG. 5 is a timing chart showing waveforms of signals output from individual sections shown in FIG. 4.

FIG. 4 shows the configuration of the noise cancellation circuit 16d. FIG. 5 shows a timing chart of the individual sections shown in FIG. 4. Such a noise cancellation circuit 16d is described in, e.g., JP-A-2002-324360.

As shown in FIG. 4, the noise cancellation circuit 16d is constituted by comprising constant current sources 211, 212; analog switch circuits 213 to 216; capacitors 220, 221; buffer amplifiers 224, 225; comparators 226, 227; an RS flip-flop 234; a reference power source 236; and an inverter circuit 237. "BINARY SIGNAL" in FIG. 5 denotes a binary signal which contains noise and is output from the binarizer 16c shown in FIG. 2. "CAPACITOR 220" shown in FIG. 5 denotes a signal output from the capacitor 220; that is, variations in the voltage for recharging the capacitor 220. "INVERTER 237" denotes a signal output from the inverter circuit 237; "CAPACITOR 221" denotes a signal output from the capacitor 221; that is, variations in the voltage to be used for recharging the capacitor 221; "COMPARATOR 226" denotes a signal output from the comparator 226; "COMPARATOR 227" denotes a signal output from the comparator 227; and "RS-FF 234" denotes a signal output from the RS flip-flop 234.

The binary signal output from the binarizer 16c is supplied from a terminal Ti to the analog switch circuit 213 and the inverter circuit 237. The inverter circuit 237 inverts the binary signal and supplies the thus-inverted binary signal to the analog switch circuit 214. The analog switch circuit 213 is activated when the binary signal output from the terminal T1 is positive and deactivated when the binary signal is negative. Further, the analog switch circuit 214 is activated when the binary signal output from the inverter circuit 237 is positive and deactivated when the binary signal is negative.

When an output from the comparator 227 has risen from a low level to a high level at time t0, the RS flip-flop 234 is set. When the RS flip-flop 234 has been set, a non-inverted output Q is brought to a high level, and an inverted output /Q is brought to a low level. When a non-inverted output Q of the RS flip-flop 234 has reached a high level, the analog switch circuit 215 is deactivated. As a result of the analog switch circuit 215 having been deactivated, the capacitor 220 can be recharged with an input pulse signal.

At this time, the inverted output /Q of the RS flip-flop 234 is brought to a low level. When the inverted output /Q of the RS flip-flop 234 has been brought to a low level, the analog switch circuit 216 is activated. As a result of the analog switch circuit 216 having been activated, the capacitor 221 is discharged. When the capacitor 221 has been discharged, the voltage of the non-inverted input terminal of the comparator 227 becomes smaller than the reference voltage of the reference power source 236, and hence an output from the comparator 227 is brought to a low level.

The capacitor 220 is recharged with the constant current source 211 during a period in which the pulse signal input at time t1 to t2 has become a high level. When the recharging voltage of the capacitor 220 has become greater than a predetermined voltage at time t2, the voltage of the non-inverted input terminal of the comparator 226 becomes greater than the reference voltage output from the reference power source 236. As a result, an output from the comparator 226 is brought from a low level to a high level.

As a result of the output from the comparator 226 having been brought from a low level to a high level, the RS flip-flop 234 is reset. When the RS flip-flop 234 is reset, the non-inverted output Q is brought to a low level, and the inverted output /Q is brought to a high level.

As a result of the inverted output /Q from the RS flip-flop 234 having been brought to a high level, the analog switch circuit 216 is deactivated. As a result of the analog switch circuit 216 being activated, the capacitor 221 is made rechargeable with a pulse signal output from the inversion circuit 237.

In contrast, when the non-inverted output Q of the RS flip-flop 234 is brought to a low level, the analog switch circuit 215 is activated. As a result of the analog switch circuit 215 being activated, the capacitor 220 is discharged. The voltage of the non-inverted input terminal of the comparator 226 becomes smaller than the reference voltage output from the reference power source 236 as a result of the capacitor 220 being discharged, and hence an output is brought to a low level.

As mentioned above, the capacitor 220 is recharged during a period in which the binary signal is brought from the low level (−) to the high level (+), and the capacitor 221 is recharged during a period in which the binary signal is brought from the high level (+) to the low level (−), thereby determining a timing at which the output is to be inverted. Thus, the influence of noise can be alleviated. As a result, the pulse length of the binary signal obtained during the positive period and the pulse length of the same obtained during the negative period can be determined accurately.

In the wobble signal processing section 16 of the embodiment, the reproduced signal output from the pickup 14 is differentiated, and the wobble signal is extracted by means of binarizing the differential signal while the zero level of the signal is taken as a reference. However, a wobble signal can also be extracted by means of binarizing the differential signal through use of another method. This will now be described hereinbelow.

Figure 6:
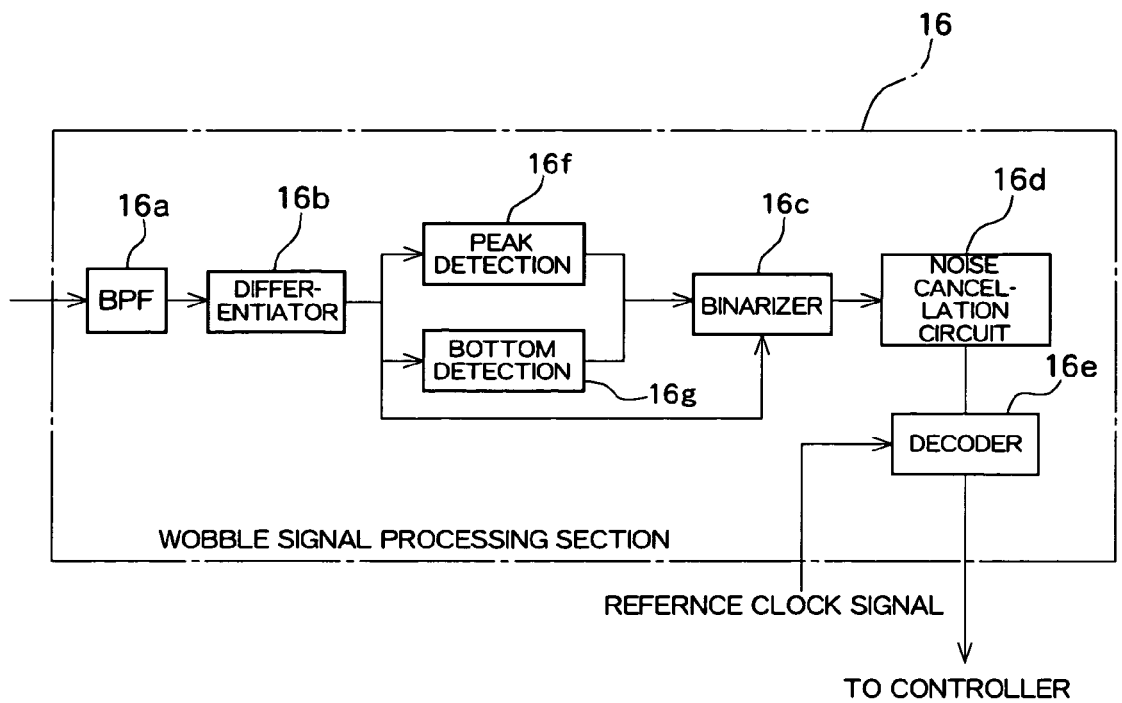
FIG. 6 is another configuration block diagram of the wobble signal processing section shown in FIG. 1.

FIG. 6 shows another configuration of the wobble signal processing section 16. The wobble signal processing section 16 comprises a band pass filter BPF 16a; a differentiator 16b; a binarizer 16c; a noise cancellation circuit 16d; a decoder 16e; and a peak detection circuit 16f and a bottom detection circuit 16g, both being interposed between the differentiator 16b and the binarizer 16c.

The reproduced signal output from the pickup 14 is supplied to the bandpass filter BPF 16a. The bandpass filter BPF 16a extracts predetermined frequency $f_{wob}$ and $2 \times f_{wob}$ components from the reproduced signal and supplies the thus-extracted components to the differentiator 16b.

The differentiator 16b subjects the signal output from the bandpass filter BPF 16a to time differentiation and supplies the differentiated signal to the peak detection circuit 16f and the bottom detection circuit 16g.

The peak detection circuit 16f and the bottom detection circuit 16g detect a peak value and a bottom value of the differential signal and supply the thus-detected values to the binarizer 16c.

The binarizer 16c takes, as a reference level, an intermediate level between the peak value output from the peak detection circuit 16f and the bottom value output from the bottom detection circuit 16g and binarizes the differential signal output from the differentiator 16b. The binary signal binarized by the binarizer 16c is supplied to the noise cancellation circuit 16d in the same manner as in the previously-described embodiment. After a noise component (chattering) has been removed from the binary signal, the binary signal is decoded by the decoder 16e.

Figure 7:
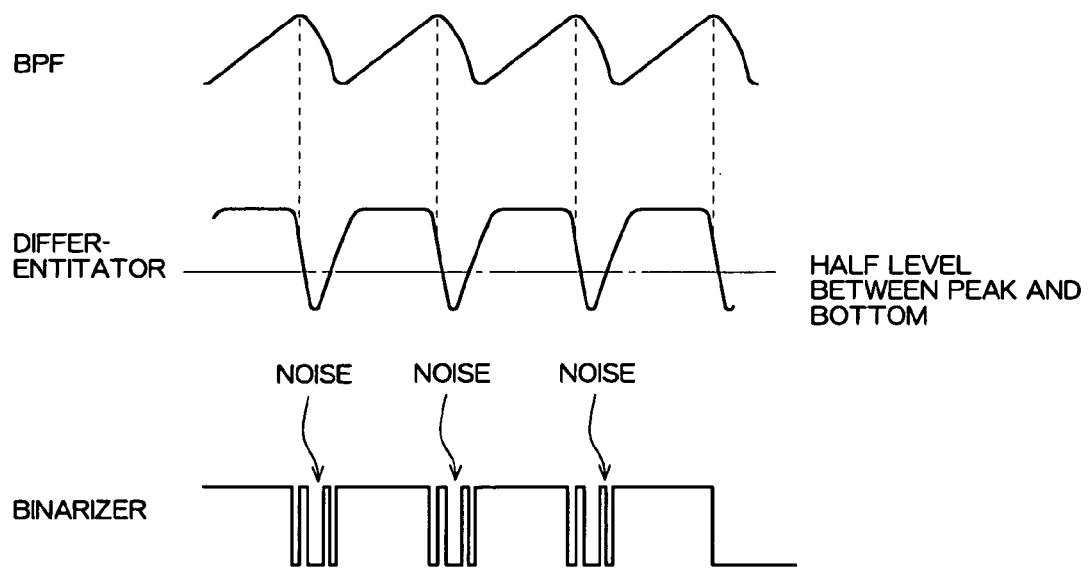
FIG. 7 is a timing chart showing waveforms of signals output from individual sections shown in FIG. 6.

FIG. 7 shows a timing chart of binarizing operation shown in FIG. 6. "BPF" denotes a signal output from the bandpass filter BPF 16a, and "DIFFERENTIATOR" denotes a differential signal output from the differentiator 16b. The binarizer 16c binarizes the differential signal while taking, as a reference value, the intermediate level between the peak value and bottom value of the differential signal. "BINARIZER" denotes a binary signal output from the binarizer 16c. Even in this case, the pulse lengths of two values of the binary signal +STW, differ from those of the two values of the binary signal −STW. The pulse length of the +STW is longer during the positive period, and that of the −STW is longer during the negative period. Hence, the decoder 16e can decode the wobble signal on the basis of the pulse lengths of the two values and supply the thus-decoded wobble signal to the CPU 32.

Identification procedures become as follows:

(1) Differentiate a wobble signal.

(2) Binarize the differentiated wobble signal while taking an intermediate value between the peak value level and the bottom value level as a threshold value.

(3) Detect the length of a binarized signal during the positive period and that of the same during the negative period.

(4) If the length detected during the positive period is longer than that detected during the negative period, the binarized signal is determined as a +STW or "1." If the length detected during the positive period is shorter than that detected during the negative period, the binarized signal is determined as a −STW or 0.

Figure 8:
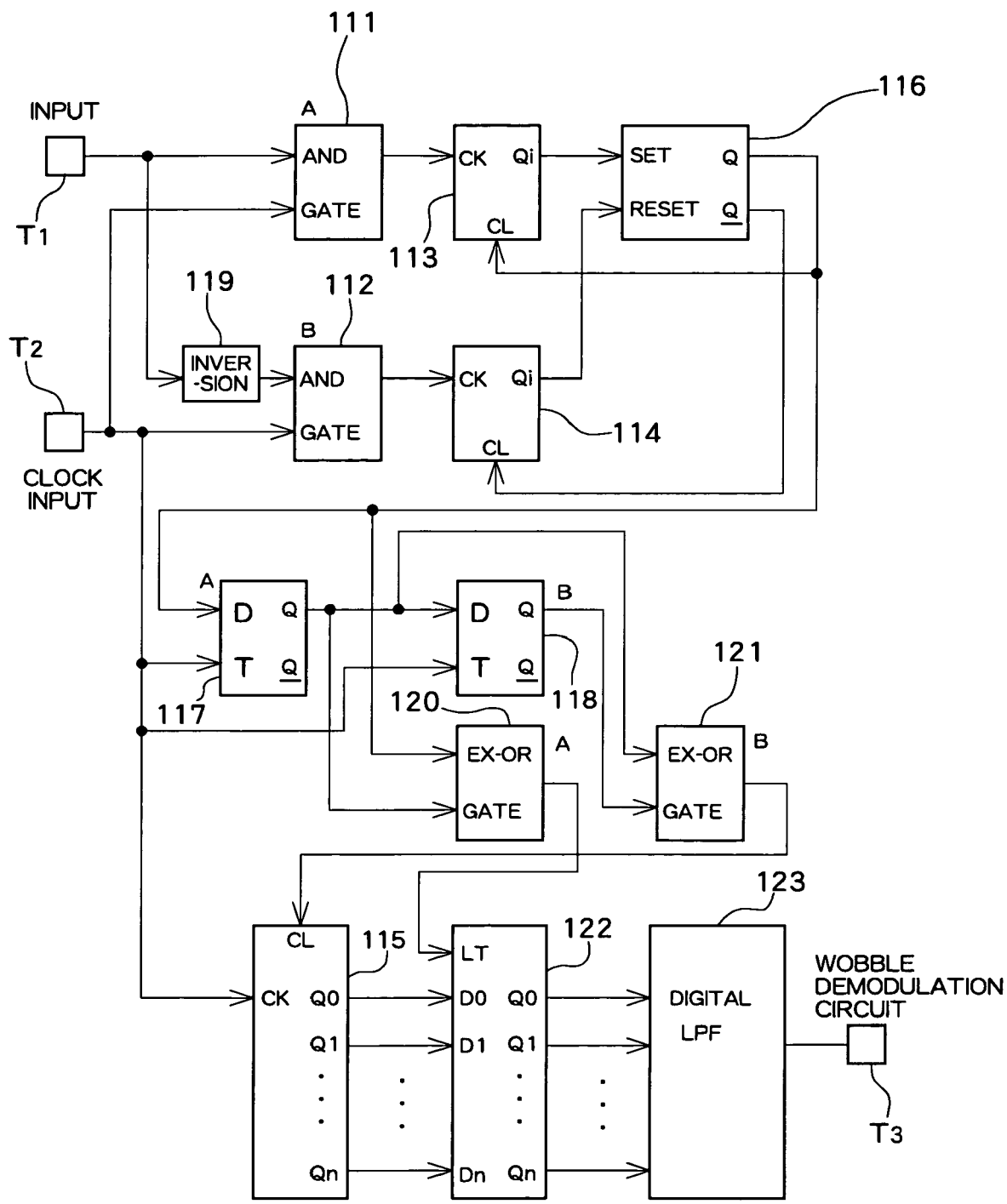
FIG. 8 is another circuit block diagram of a noise cancellation circuit shown in FIG. 2.

The noise cancellation circuit can be configured in a configuration other than that of the circuit shown in FIG. 4. FIG. 8 shows another configuration of the noise cancellation circuit 16d, and FIG. 9 shows a timing chart of individual sections.

The noise cancellation circuit 16d comprises AND gates 111 and 112; counters 113, 114, and 115; an RS flip-flop 116; D flip-flops 117 and 118; an inverter circuit 119; EX-OR gates 120 and 121; a latch circuit 122; and a digital LPF (low-pass filter) 123. In this embodiment, the noise cancellation circuit 16d is imparted with a counting function for measuring a pulse length during a positive period and a negative period.

Figure 9:
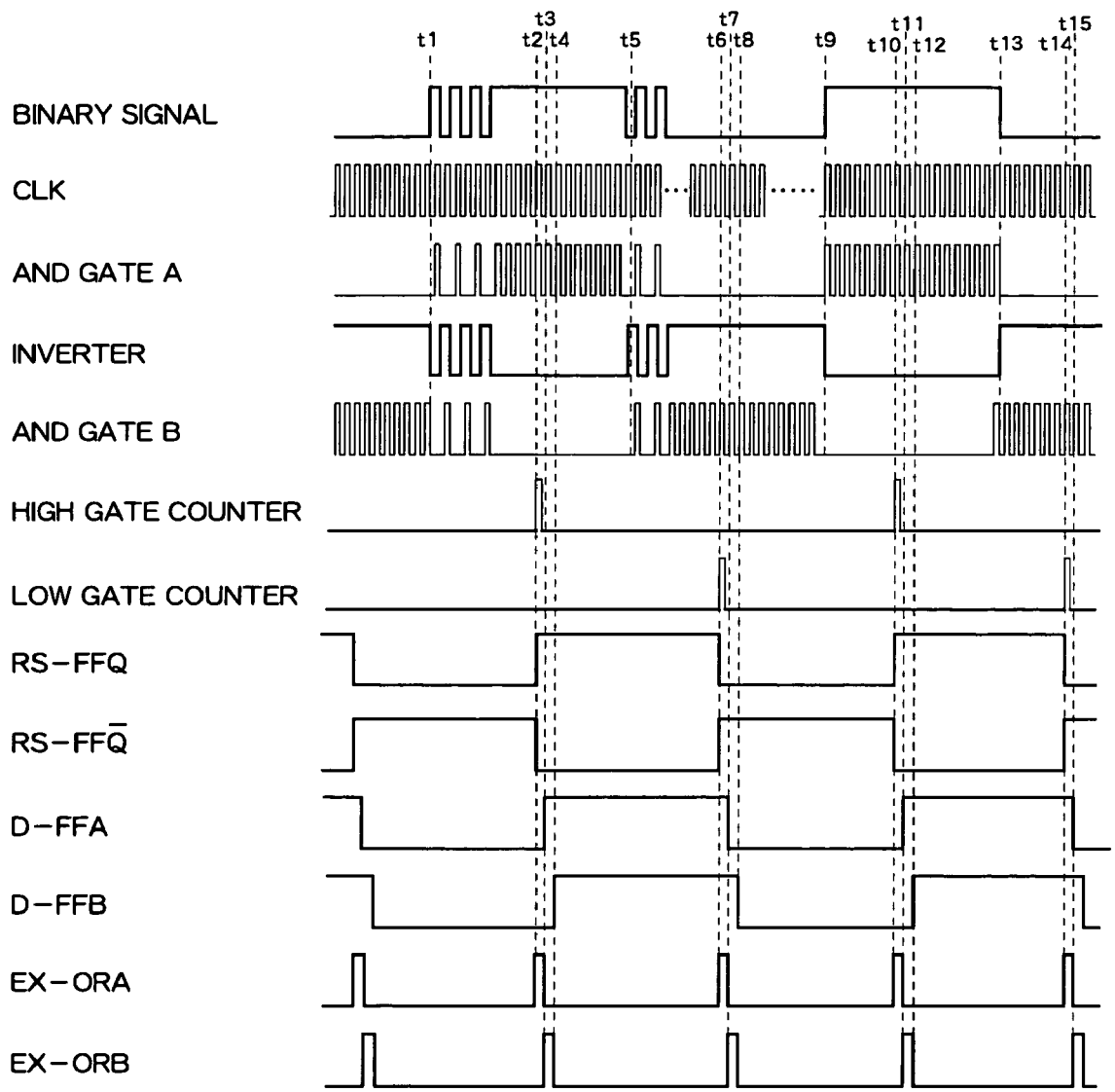
FIG. 9 is a timing chart showing waveforms of signals output from individual sections shown in FIG. 8.
Figure 10:
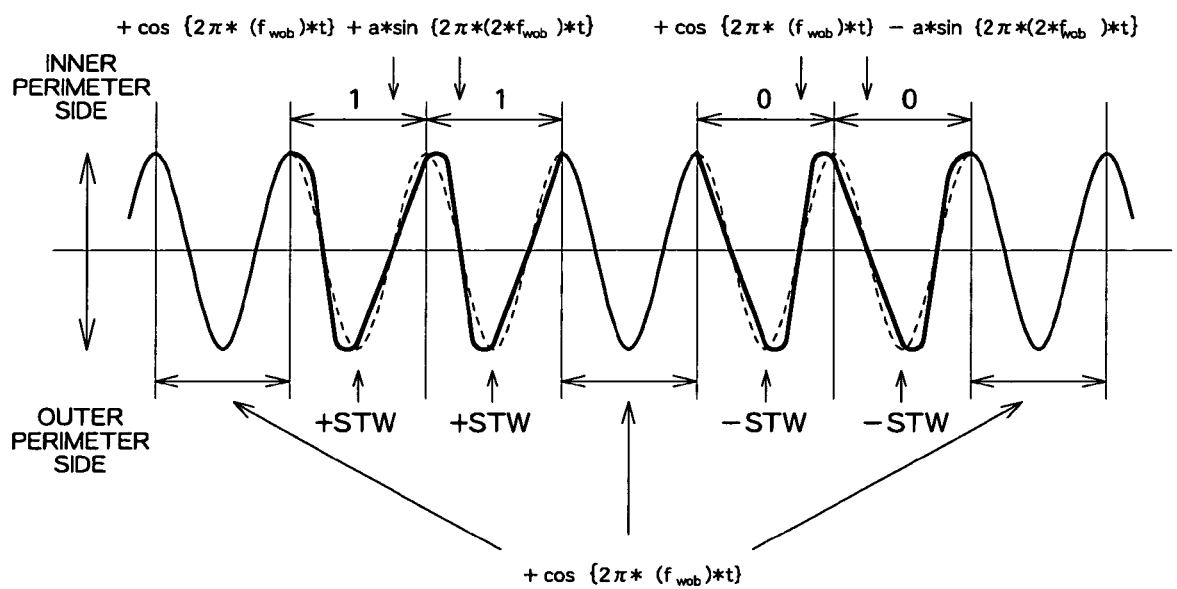
FIG. 10 is a descriptive view showing a sawtooth wobble signal.

In FIG. 9, "BINARY SIGNAL" denotes a binary signal output from the binarizer 16c; "CLK" denotes a clock signal; "AND GATE A" denotes a signal output from the AND gate 111; "INVERTER" denotes a signal output from the inverter circuit 119; "AND GATE B" denotes a signal output from the AND gate 112; "HIGH GATE COUNTER" denotes a signal output from the counter 113; "LOW GATE COUNTER" denotes a signal output from the counter 114; "RS-FFQ" denotes a non-inverted signal output from the RS flip-flop 116; "RS-FF$\overline{Q}$" denotes an inverted signal output from the RS flip-flop 116; "D-FFA" denotes a signal output from the D flip-flop 117; "D-FFB" denotes a signal output from D flip-flop 118; "EX-ORA" denotes a signal output from the EX-OR gate 120; and "EX-ORB" denotes a signal output from the EX-OR gate 121.

The binary signal is supplied from the terminal T1 to the AND gate 111 and the inverter circuit 119. The clock signal CLK is supplied from a terminal T2 to the AND gate 111 and the AND gate 112.

When the binary signal delivered from the terminal Ti remains at a high level (+), the AND gate 111 permits the clock signal output from the terminal T2 to pass, thereby supplying the clock signal to the clock input terminal of the counter 113. The counter 113 counts the clock signal output from the AND gate 111 and supplies the value Qi of the $i^{th}$ digit of the count value to a set terminal of the RS flip-flop 116. In FIG. 9, an explanation is given while taking a case where "i" corresponds to "3."

The inverter circuit 119 inverts the binary signal output from the terminal T1 and supplies the thus-inverted binary signal to the AND gate 112. When the inverted binary signal output from the inverter circuit 119 is at a high level, the AND gate 112 permits the clock signal delivered from the terminal T2 to pass, and thus the clock signal is supplied to the clock input terminal of the counter 114.

The counter 114 counts the clock signal output from the AND gate 112 and supplies the value Qi of the $i^{th}$ digit of the count value to a reset terminal of the RS flip-flop 116. When the count value Qi of the $i^{th}$ digit of the counter 113 has risen, the RS flip-flop 116 sets the non-inverted output Q; that is, brings the non-inverted output Q to a high level. When the count value Qi of the $i^{th}$ digit of the counter 114 has risen, the RS flip-flop 116 resets the non-inverted output Q; that is, brings the non-inverted output Q to a low level.

The non-inverted output Q of the RS flip-flop 116 is supplied to a clear terminal of the counter 113 and further to the D flip-flop 117 and the EX-OR gate 120. The inverted output /Q of the RS flip-flop 116 is supplied to the clear terminal of the counter 114.

The counter 113 is brought into a clear state when the non-inverted output Q of the RS flip-flop 116 is at a high level. The counter 114 is brought into a clear state when the inverted output /Q of the RS flip-flop 116 is at a high level.

The non-inverted output Q of the RS flip-flop 116 is supplied to a data terminal of the D flip-flop 117, and the clock signal output from the terminal T2 is supplied to the clock terminal. The D flip-flop 117 maintains the level of the data terminal achieved at the time of rise of the clock signal and outputs the thus-maintained level. The output Q of the D flip-flop 117 is supplied to the data terminal of the D flip-flop 118 and the EX-OR gate 120. The EX-OR gate 120 outputs an EX-OR logical result of the non-inverted output Q of the RS flip-flop 116 and the output of the D flip-flop 117. The output from the EX-OR gate 120 is supplied to the latch 122. The latch 122 latches an output from the counter 115 in accordance with an output from the EX-OR gate 120.

The output Q from the D flip-flop 117 is supplied to the data terminal of the D flip-flop 118, and a clock signal is supplied from the terminal T2 to the clock terminal of the D flip-flop 118. The D flip-flop 118 retains the level of the data terminal achieved at the time of rise of the clock signal and outputs the thus-retained level. An output Q from the D flip-flop 118 is supplied to the EX-OR gate 121. The EX-OR gate 121 outputs the EX-OR logical result of the output from the D flip-flop 117 and the output from the D flip-flop 118. The output of the EX-OR gate 121 is supplied to a clear terminal of the counter 115. The counter 115 clears a count value in accordance with an output from the EX-OR gate 121.

The counter 115 counts the clock signal from the terminal T2 and supplies the count value to the latch circuit 122. The latch circuit 122 latches the count value output from the counter 115 at a rise of the output from the EX-OR gate 120.

The digital LPF 123 outputs a signal, such as address information written as variations in the digital value from the latch circuit 122; for example, a bi-phase signal.

The counter 114 remains in a cleared state at times t1 and t9 in FIG. 9, because the inverted output /Q of the RS flip-flop 116 is at a high level. Further, the non-inverted output Q of the RS flip-flop 116 is at a low level, and hence the counter 113 counts a clock signal output from the AND gate 111.

An output Qi from the counter 113 is set to a value Q3 of the third digit. Therefore, when the clock signal output from the AND gate 111 is counted up to eight since the beginning of counting operation, the output Qi is inverted from a low level to a high level at times t2 and t10

When the output Qi from the counter 113 has been inverted to a high level at times t2 and t10, the non-inverted output Q from the RS flip-flop 116 is brought to a high level, and the inverted output /Q is brought to a low level. When the inverted output Q of the RS flip-flop 116 enters a low level, the counter 114 is released from a cleared state, whereupon the counter 114 initiates counting of the clock signal output from the AND gate 112. At this time, since the non-inverted output Q from the RS flip-flop 116 is brought to a high level, the counter 113 is brought to a cleared state.

When the output from the RS flip-flop 116 is brought to a high level at times t2, t10, the output from the D flip-flop 117 is held at a low level until the next clock signal. Hence, the input of the EX-OR gate 120 is brought from a high level to a low level, and the output from the same is inverted from a low level to a high level. As a result of the output from the EX-OR gate 120 having been inverted from a low level to a high level, the latch circuit 122 latches the output from the counter 115 at an up edge of the output from the EX-OR gate 120.

When the output from the D flip-flop 117 has reached a high level at times t3, t11, one input of the EX-OR gate 121 is brought to a high level. At this time, the output from the D flip-flop 118 is held at a low level until the next clock signal is supplied, and hence the other input of the EX-OR gate 121 is at a low level. Therefore, the output from the EX-OR gate 121 is inverted from a low level to a high level. As a result of the output from the EX-OR gate 121 being brought from a low level to a high level, the counter 115 clears the count value. As mentioned above, after the count value of the counter 115 has been latched by the latch circuit 122, the count value of the counter 115 is cleared.

When the clock signal has risen at times t4, t12, the D flip-flop 118 latches the non-inverted output Q at a high level. As a result of the non-inverted output Q from the D flip-flop 118 having been brought to a high level, the two inputs of the EX-OR gate 121 are brought to a high level. Hence, the EX-OR gate 121 returns to a low level, thereby achieving a state in which the counter 115 can be cleared.

Next, when the binary signal has reached a low level (−) at times t5, t13, the counter 114 counts the clock signal from the AND gate 112, because the inverted output /Q from the RS flip-flop 116 is at a low level. When the value Q3 of the third digit of the count value of the counter 114 has risen at times t6, t14, the output from the RS flip-flop 116 is reset. When the RS flip-flop 116 has been reset, the output from the EX-OR gate 120 is brought from a low level to a high level, and the latch 122 latches the count value of the counter 115 achieved at that time.

When the clock signal has risen at times t7, t15, the D flip-flop 117 latches the output Q from the RS flip-flop 116, and the output of the D flip-flop 117 is brought to a low level. As a result of the output from the D flip-flop 117 having been brought to a low level, the output from the EX-OR gate 120 is brought to a low level. Further, as a result of the output from the D flip-flop 117 having been brought to a low level, the output from the EX-OR gate 121 is brought to a high level, and hence the counter 115 is cleared. Upon the clock signal supplied to the D flip-flop 118 having been risen at time t8, the D flip-flop 118 latches an output from the D flip-flop 117, and the output from the D flip-flop 118 is brought to a low level.

As mentioned above, counting operation is performed from when a rise or fall of the binary signal is detected up to a predetermined count value during a positive level period or a negative level period, thereby detecting a fall or rise of the next binary signal. As a result of counting operation being performed up to a predetermined count value during a negative level period or a positive level period, counting operation does not have to be performed during a period during which noise is included. Therefore, counting operation can be performed only during a positive level period or negative level period. Hence, the influence of noise can be alleviated, thereby enabling accurate detection of a positive level period and a negative level period of the binary signal.

The embodiments have been described thus far. However, the invention is not limited to the embodiments and is susceptible to various modifications. For instance, in the embodiments, a differential signal of a wobble reproduced signal is binarized. Pulse lengths of two values of the binary signal are measured and compared with each other. If a relationship of (a pulse length during a positive period)>(a pulse length during a negative period) is satisfied, the binary signal is taken as +STW or "1." If a relationship of (a pulse length during a positive period)<(a pulse length during a negative period) is satisfied, the binary signal is taken as −STW or "0." However, for instance, the pulse length achieved during the positive period is compared with the appropriately-set reference length Lth. If (the pulse length achieved during the positive period)>(the reference length Lth), the binary signal is determined to be a +STW; that is, "1." If (the pulse length achieved during the positive period) <(the reference length Lth), the binary signal is determined to be a −STW; that is, "0." If the pulse length achieved during the positive period is longer than the reference length $L^{th}$ as a result of the reference length $L^{th}$ having been set appropriately, the pulse length achieved during the positive period can be inevitably made longer than that achieved during the negative period.

What is claimed is:

1. An optical disk apparatus for recording or reproducing data on and from an optical disk, the apparatus comprising:
   a wobble of said optical disk being a sawtooth wobble which is obtained as a result of a sine wave being added to or subtracted from a cosine wave of predetermined frequency;
   light-receiving means for receiving a laser beam reflected from said optical disk; and
   wobble processing means for acquiring a wobble signal from a signal output from said light-receiving means, wherein
   said wobble processing means comprises
      differentiating means for differentiating a signal output from said light-receiving means;
      binarizing means for binarizing a differential signal from said differentiating means through use of a threshold value;
      pulse length detection means for detecting pulse lengths of two values of a binary signal from said binarizing means; and
      demodulation means for demodulating said binary signal in accordance with said pulse lengths of said respective two values of said binary signal.

2. The apparatus according to claim 1, wherein said threshold value is a zero level of said differential signal.

3. The apparatus according to claim 1, wherein said threshold value is an intermediate level between a peak value and a bottom value of said differential signal.

4. The apparatus according to claim 1, wherein said demodulation means compares pulse lengths of said two values of said binary signal with each other, to thus determine which one of said pulse lengths is longer than the other pulse length.

5. The apparatus according to claim 1, wherein said demodulation means compares at least any one of pulse lengths of said two values of said binary signal with a reference value, to thus determine whether said pulse length is larger or smaller than said reference value.

6. The apparatus according to claim 1, wherein, when a sawtooth wobble obtained as a result of a sine wave being added to a cosine wave of predetermined frequency is taken as a +STW and when a sawtooth wobble obtained as a result of said sine wave being subtracted from said cosine wave of predetermined frequency being taken as a −STW, said demodulation means determines said sawtooth wobble as a +STW or a −STW in accordance with the pulse lengths of said two values of said binary signal.

7. The apparatus according to claim 1, further comprising:
   means for eliminating noise from a rise or fall timing of said binary signal output from said binarizing means and outputting said timing to said pulse length detection means.

8. An optical disk apparatus for recording or reproducing data on and from an optical disk, the apparatus comprising:
   a wobble of said optical disk being a sawtooth wobble including a +STW signal obtained as a result of a sine wave being added to a cosine wave of predetermined frequency and a −STW signal obtained as a result of a sine wave being subtracted from said cosine wave of predetermined frequency;
   a pickup for receiving a laser beam reflected from said optical disk;
   a bandpass filter for extracting a wobble signal of predetermined frequency from a signal output from said pickup;
   a differentiator for differentiating a signal output from said bandpass filter;
   a binarizer for binarizing a differential signal from said differentiator through use of a threshold value; and
   a decoder which detects, from binary signal output from said binarizer, a signal length equal to or larger than said threshold value and a signal length smaller than said threshold value and which determines said binary signal as said +STW signal when said signal length equal to or larger than said threshold value is longer than said signal length smaller than said threshold value and which determines said binary signal as said −STW signal when said signal length equal to or larger than said threshold value is shorter than said signal length smaller than said threshold value.

9. The apparatus according to claim 8, further comprising:
   a detector for detecting a zero level of said differential signal, wherein
   said binarizer binarizes said differential signal while taking said zero level as said threshold value.

10. The apparatus according to claim 8, further comprising:
    a peak detector for detecting a peak value of said differential signal; and
    a bottom detector for detecting a bottom value of said differential signal, wherein said binarizer binarizes said differential signal while taking, as said threshold value, an intermediate level between said peak value and said bottom value.

* * * * *